June 15, 1954  G. GUANELLA  2,681,384
CROSS-TALK CONTROL IN PULSE MULTIPLEX TRANSMISSION SYSTEMS
Filed Oct. 1, 1951  7 Sheets-Sheet 1

INVENTOR
GUSTAV GUANELLA.
BY
ATTORNEY

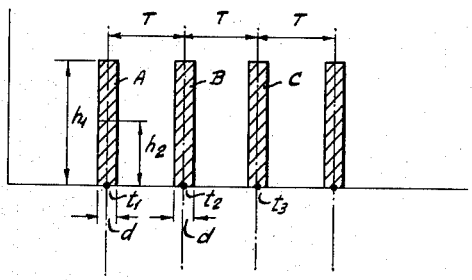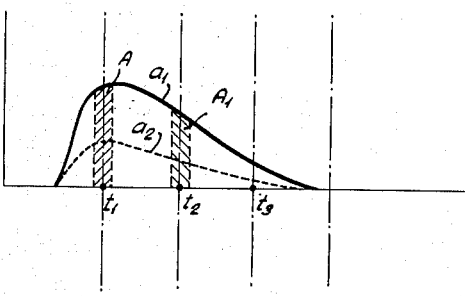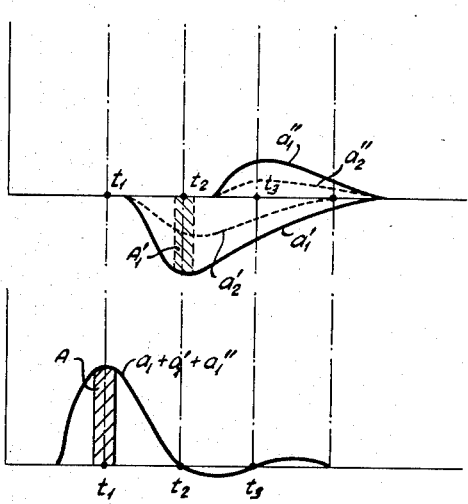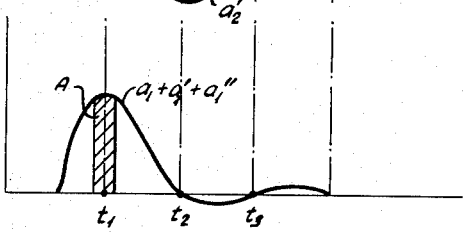

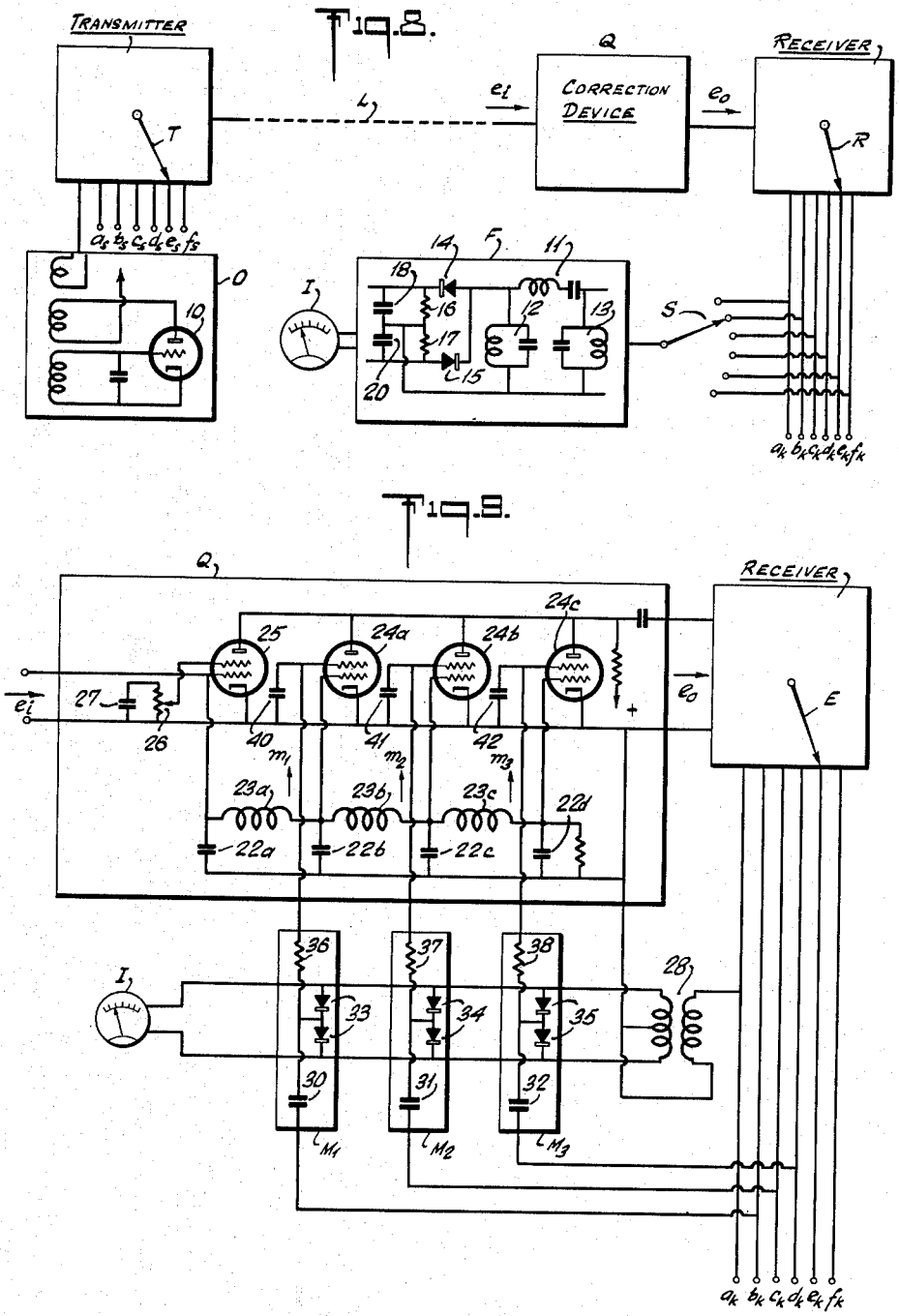

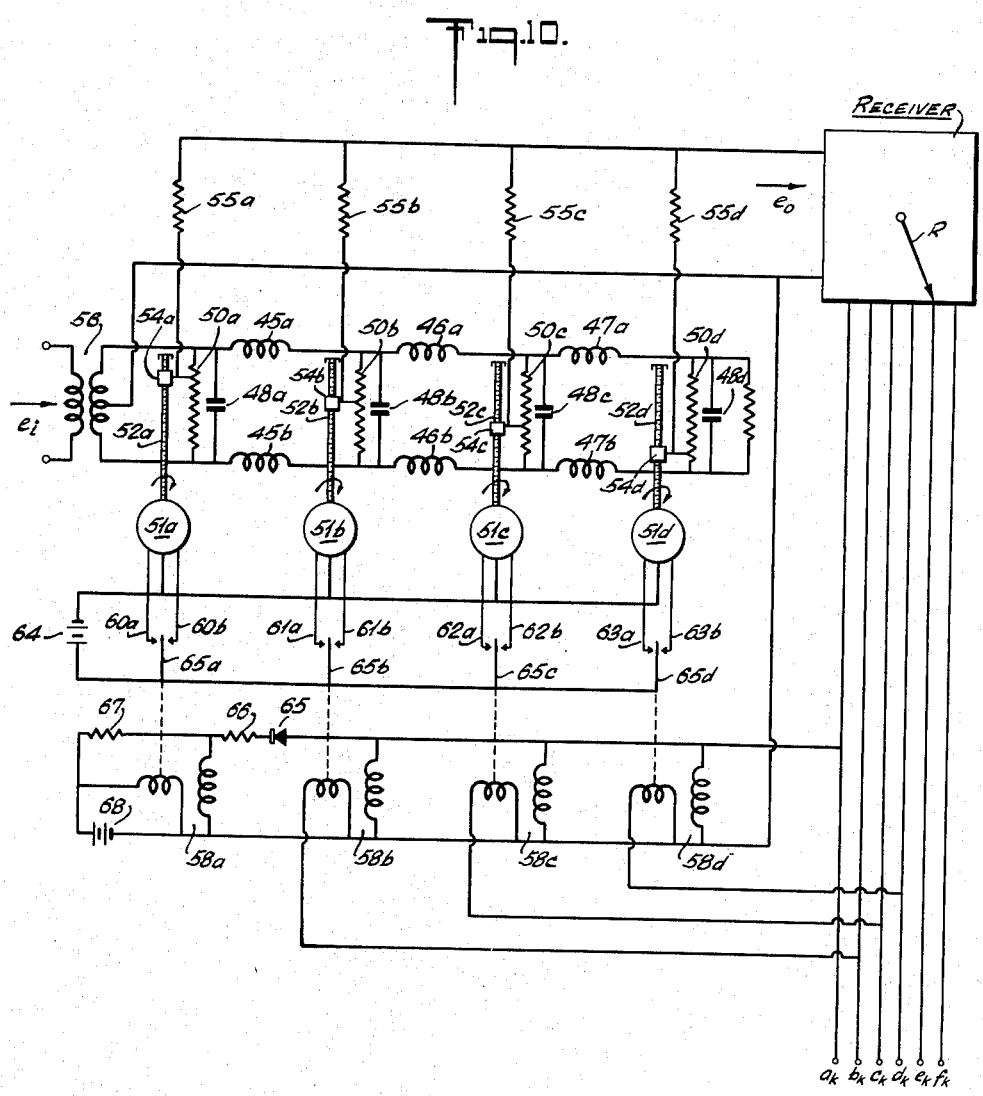

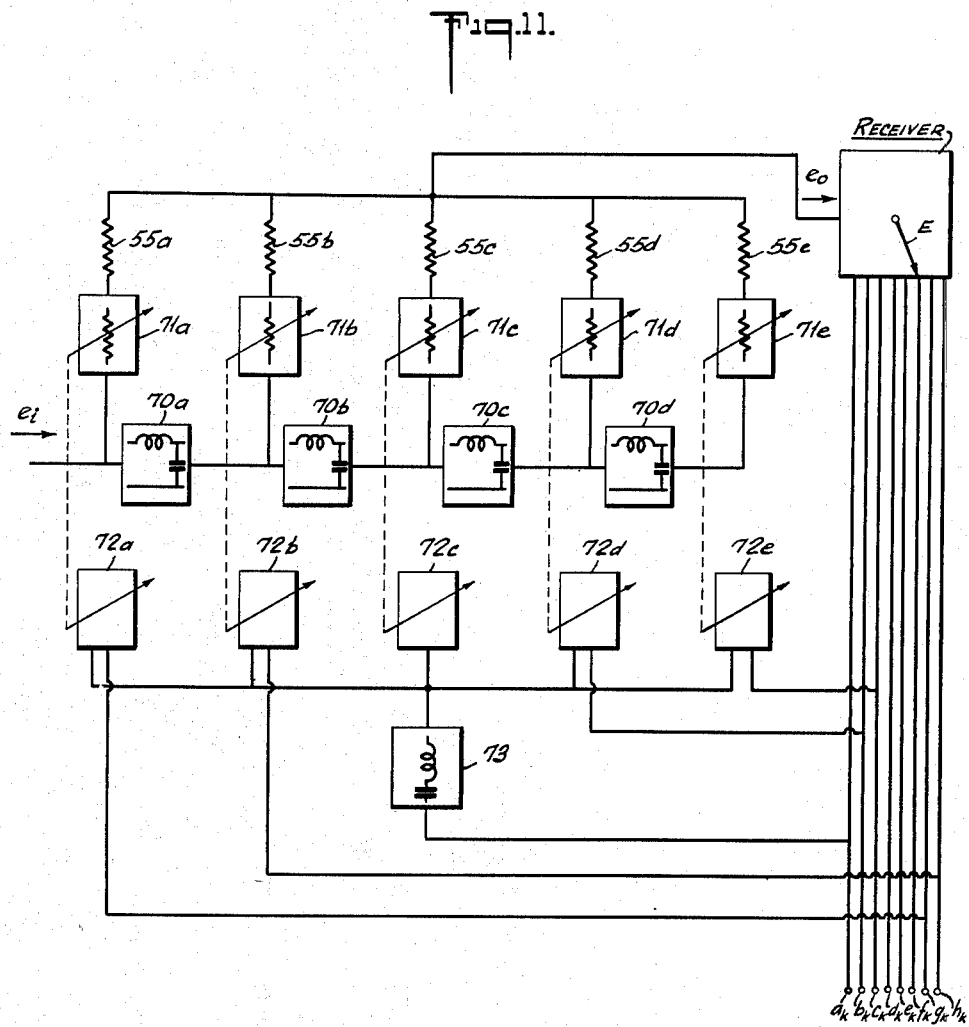

June 15, 1954 G. GUANELLA 2,681,384
CROSS-TALK CONTROL IN PULSE MULTIPLEX TRANSMISSION SYSTEMS
Filed Oct. 1, 1951 7 Sheets-Sheet 7

INVENTOR
GUSTAV GUANELLA.
BY
ATTORNEY

Patented June 15, 1954

2,681,384

UNITED STATES PATENT OFFICE 2,681,384

CROSS-TALK CONTROL IN PULSE MULTIPLEX TRANSMISSION SYSTEMS

Gustav Guanella, Zurich, Switzerland, assignor, by mesne assignments, to Radio Patents Company, a partnership Application October 1, 1951, Serial No. 249,036

10 Claims. (Cl. 179—15.6)

This application is a continuation-in-part of application Serial No. 627,721, filed November 9, 1945, entitled Cross-Talk Compensation in Pulse Multiplex Systems, now Patent No. 2,580,421.

The present invention relates to signal transmission by means of pulse modulation, using signal pulses modulated according to or being characteristic of different instantaneous signal amplitudes or sampling values, and the main object of the invention is to provide an improved system for and method of suppressing mutual interference between neighboring pulses in a system of this type.

More specifically, the invention is concerned with time division pulse multiplex signal transmission, wherein adjacent pulses represent different signals or messages being transmitted through a common transmission channel, and the improvement according to the invention serves to reduce and maintain cross-talk between adjacent signal channels at a minimum.

In time division pulse multiplex signal transmission, the modulated pulses are impressed successively upon a transmission channel such as a cable, transmission line or the like. Successive pulses are modulated in accordance with the instantaneous amplitudes of different signals or messages, in such a manner that the amplitude of the $(m+k.n)th$ pulse corresponds to the instantaneous or sampling value of the $m$th signal, $k$ being a whole number and $n$ representing the total number of multiplex signals or pulse time channels of the system.

A disadvantage of pulse transmission systems of the above and similar types, using spaced pulses representing different instantaneous signal or sampling values, is the fact that unavoidable cross-interference between adjacent pulses or channels occurs as a result of the flattening or distortion of the pulses prior to or during transmission.

This interference between or encroachment of one pulse upon an adjacent pulse may be due to the flattening or trail distortion of the pulses caused by the transmission circuits or elements, such as a long line or cable, or it may result from an intentional conversion of the sharply defined rectangular pulses produced by a square wave pulse generator into bell-shaped or so-called Gaussian pulses, in order to improve the transmission characteristics, in particular to reduce the total frequency transmission band width required.

A more specific object of the invention is the provision of a simple method of and means for adjusting the cross-talk compensating device, to effect optimum cross-talk suppression in a pulse transmission system.

Still another object is the provision of means to automatically adjust and maintain the cross-talk compensation, independently of changes and variations in the operating conditions.

Further objects and novel aspects of the invention will become more apparent from the following detailed description taken with reference to the accompanying drawings, forming part of this specification, and wherein:

Figure 6 shows a compensating system according to the invention including adjusting means for controlling the cross-interference between adjacent pulses;

Figure 8 illustrates a system similar to Figure 6 with parts thereof shown in greater detail;

Figure 9 is a detailed wiring diagram of a time division pulse multiplex receiver including automatic cross-talk compensation means according to the invention;

Figure 10 is a similar diagram showing a modification of Figure 9;

Figure 11 is a block diagram including a modified compensating network according to the invention;

Like characters of reference identify like parts or devices throughout the different views of the drawings.

In pulse signal transmission systems of the above and similar type, the pulses which are of rectangular form at the transmitter, become deformed or distorted after transmission over a long line or cable, due to the different transit times of the various frequency components or as a result of other causes. In other words, the pulses decrease or decay gradually, thus providing a current or voltage trail at the time when the next pulse or the second next pulse arrives at the receiver. This trail distortion will result in mutual interference such as cross-talk between adjacent pulses or signal channels to an extent depending upon the characteristics of the transmission line and circuits.

Figure 1:
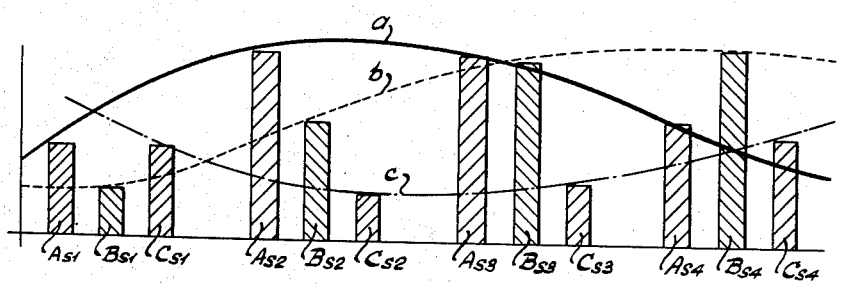
Figures 1 and 2 are diagrams showing the shape of the pulses in a time division pulse multiplex transmission system before and after transmission through a signaling channel, respectively.

Thus, referring to Figure 1, the signal pulses $A_{s1}$, $A_{s2}$, $A_{s3}$, forming a first pulse time channel, are amplitude modulated according to the instantaneous or sampling values of a signal wave $a$. In a similar manner, the pulses $B_{s1}$, $B_{s2}$ ... and $C_{s1}$, $C_{s2}$ ..., interlaced with the pulses $A_{s1}$, $A_{s2}$, ... represent further channels transmitting the signals $b$ and $c$, respectively. Additional pulse time channels may be provided for the transmission of a desired number of signals, whereby to provide a series of equi-spaced pulses with the like order pulses of successive and periodic equal-numbered groups of pulses being modulated in accordance with the instantaneous amplitudes of different modulating signals.

The pulses may be transmitted either directly or by modulating a high frequency carrier oscillation. As a result of unavoidable amplitude and phase distortion caused by the transmission line and circuits, the pulses will be distorted or flattened, that is each pulse, in place of its initial sharp cut-off, decreases exponentially in the form of a trail gradually approaching zero.

Figure 2:
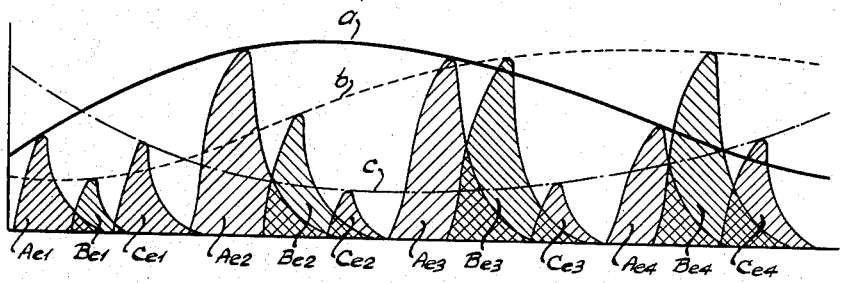

Consequently, the received signal pulses $A_{e1}$, $A_{e2}$, ..., $B_{e1}$, $B_{e2}$ ... and $C_{e1}$, $C_{e2}$ ..., Figure 2, may encroach upon or overlap one or more succeeding pulses, whereby to cause mutual interference or cross-talk between adjacent signal channels. Thus, in Figure 2, the trail of pulse $A_{e1}$ is shown to overlap the succeeding pulse $B_{e1}$, resulting in interference or cross-talk from the first upon the second channel in the receiver. Similarly, cross-talk from one pulse upon two or more succeeding pulses may occur, such as shown by the pulse $A_{e2}$ encroaching upon both the next two succeeding channels or pulses $B_{e2}$ and $C_{e2}$.

The amplitude of the distorted pulses is proportional to the original signal amplitude, while the shape of the pulses of different amplitudes remains substantially the same, as a result of the exponential shape of the trail resulting from the frequency-dependent amplitude and phase distortion during transmission. Accordingly, the cross-talk factor between any channel and an adjacent channel will be substantially constant, the same applying to the cross-talk factor from a first to a third channel and so on. Only the cross-talk in the second and possibly the third channel need be considered, the effect upon the more remote channels being negligible for most practical purposes. However, interference in any remote channel can be eliminated by the invention in a most simple manner, as will be understood from the following.

Figure 3:
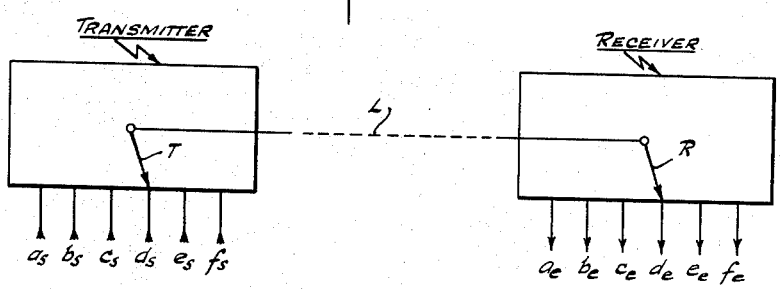
Figure 3 is a block diagram illustrating the basic lay-out and operation of a time division multiplex pulse system.

Multiplex transmission of signals of the type according to Figures 1 and 2 is carried out in practice by means of apparatus shown by the block diagram, Figure 3. In the latter, six transmitting signal channels $a_s$ to $f_s$ are successively and periodically connected to a common transmission channel L (line, cable, etc.) such as by means of a periodic transmitting switch or distributor T, a similar synchronously operating switch or distributor R being provided at the receiver, to effect a separation and distribution of the received pulses upon the respective receiving channels $a_e$ to $f_e$. The switching devices or distributors T and R are advantageously in the form of cathode ray switches, comprising a rotating electron beam successively contacting a number of circularly arranged targets or output electrodes connected with the respective signal receiving circuits.

Harmonic components of the transmitted signals due to the sampling or conversion of the signals into spaced pulses may be suppressed by filtering, whereby to reproduce the original signal waves or other information being transmitted.

Figure 4:
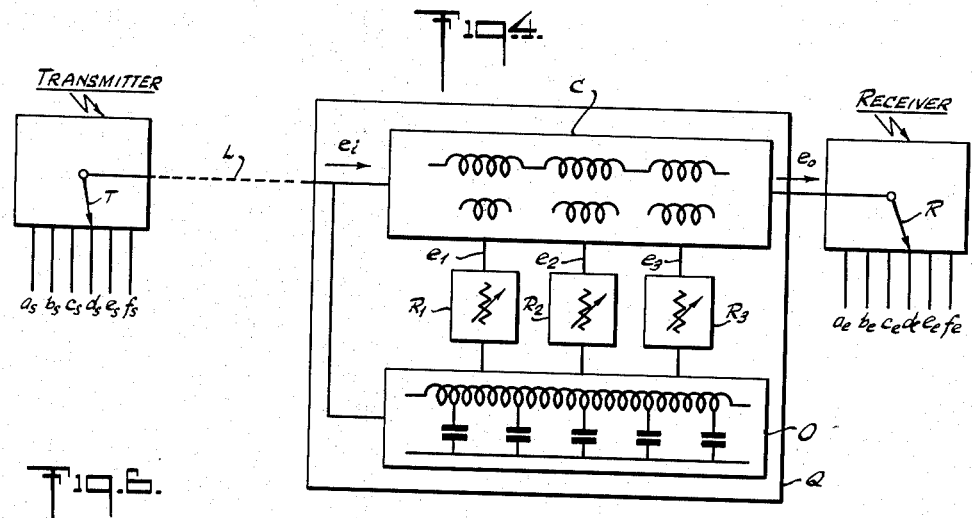
Figure 4 is a basic diagram of a cross-talk compensating network according to the invention.

Referring to Figure 4, there is shown a cross-talk compensating network Q according to the invention inserted in the common transmission channel L. Network Q serves to produce correcting pulses which are displaced in time and derived by a corresponding delay of the main pulses to be corrected. T and R again indicate the synchronously operated switching or gating devices at the transmitter or receiver, respectively. The delay device D, forming a by-pass to the main signal path L, may be an artificial line provided with a number of tap points from which the compensating signals or pulses $e_1$, $e_2$, $e_3$ are derived with a time delay relative to the corresponding input signals $e_i$ of at least approximately one, twice, etc. of a pulse spacing interval. The amplitudes of the derived correcting or compensating pulses are adjusted by means of potentiometers or variable resistors $R_1$, $R_2$ and $R_3$. The correcting pulses are then added to the main signals $e_i$ in a coupling device C, such as by means of individual coupling transformers, in such a manner as to obtain a resultant corrected output signal $e_0 = e_i + e_1 + e_2 + e_3$.

More specifically, a correcting signal or pulse $e_1$ of reduced amplitude will occur at the output of potentiometer $R_1$, when the pulse $B_{e1}$ which follows the pulse $A_{e1}$ appears in the received signal $e_i$. The received pulse $B_{e1}$ may thus be corrected by an adjustable fraction of the pulse $A_{e1}$. This correction is obtained by a suitable adjustment of the control $R_1$, in such a manner that the part of the pulse $A_{e1}$ which has been flattened or distorted by the transmission and encroaches upon the pulse $B_{e1}$ is substantially cancelled by the correcting pulse.

If the damping conditions make it necessary, adjustable amplifiers may be substituted for the variable resistors or a common amplifier may be provided preceding the input of the delay line D. The polarity and amplitude of the correcting pulse $e_1$ should be such, depending upon the transmission means employed, that there is no cross-talk from the first to the second channel of the system. Cross-talk from the second to the third channel, from the third to the fourth channel, etc. is simultaneously eliminated, since the cross-talk factors of adjacent channels are substantially equal, as pointed out above.

In a similar manner, cross-talk between any channel and the second or third next channels may be corrected by the proper adjustment of the amplitude and polarity of the correcting pulses $e_2$ and $e_3$, by the controls $R_2$ and $R_3$, respectively. When $e_2$ is adjusted by the resistor $R_2$, any additional cross-talk from the first channel upon the third channel resulting from the correcting pulse $e_1$ is also taken into account.

Figure 5:
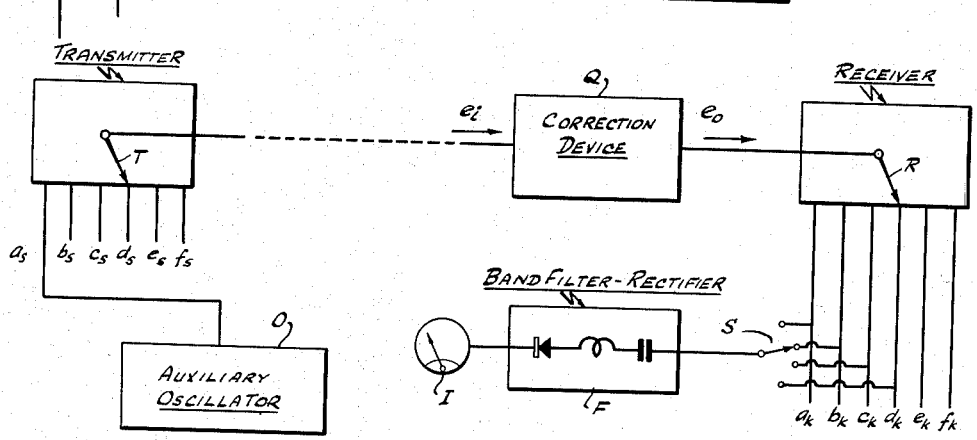
Figures 5A to 5D are diagrams illustrating the function of and results obtained by means of the compensating network shown in Figure 4.

The function and operation of the cross-talk suppression network above described will be further understood by reference to Figures 5A to 5D. A, B and C, Figure 5A, represent the original square signal pulses of any three adjacent channels at the transmitter, while $a_1$, Figure 5B, indicates a distorted or lengthened pulse at the receiver corresponding to the transmitted pulse A. From this distorted pulse $a_1$ there is derived the compensating pulse $a_1'$, Figure 5C, being delayed with respect to the pulse $a_1$ by a time period T representing the fixed pulse repetition or spacing intervals. By the proper adjustment of the amplitude and polarity of the compensating pulse $a_1'$, the latter cancels the distorted or trailing portion of the pulse $a_1$.

In connection with this operation, it is significant that, by the action of the switching or gating devices T and R at the transmitter and receiver, only short pulses of duration $d$ will be selected by the receiving distributor at the instants $t_1$, $t_2$, $t_3$ from the received distorted pulses, thus producing a pulse A, Figure 5B, substantially proportional to the original transmitted pulse. For the same reason, only the relative short portion $A_1$ of the distorted pulse $a_1$ occurring at the instant $t_2$ has to be cancelled by a corresponding portion $A_1'$ of the compensating pulse $a_1'$, Figure 5C. In other words, all that is necessary, as a result of the gating of the signals by the distributor at the receiver, is to insure a compensation of the distorted portion of the original pulses by the delayed pulses at the instants $t_2$, $t_3$, etc. This condition is fulfilled by using fixed delay periods equal to a whole number, including unity, multiple of the pulse repetition interval T.

If the amplitude of the pulse A is varied during modulation or for other reasons, say from a height $h_1$ or $h_2$, as shown in Figure 5A, the distorted pulse $a_2$ will produce a proportionally reduced interfering pulse $A_1$, which is cancelled by a correspondingly reduced compensating pulse $A_1'$ selected from the delayed pulse $a_2'$ by the gating device.

Since in Figure 5B, the distorted pulse $a_1$ is shown to overlap both the first and second adjacent pulses at the instants $t_2$ and $t_3$, a further correcting pulse $a_1''$, Figure 5C, delayed by a time interval equal to 2T is shown, to result in a final corrected signal $a_1 + a_1' + a_1''$, Figure 5D. This corrected signal passes through zero at instants $t_2$ and $t_3$, whereby the pulses selected by the gating device at these instances will be dependent upon the original signal pulses B and C only and cross-talk is substantially eliminated. This result is obtained by the proper time delay of compensating pulses by intervals equal to whole number multiples of the pulse repetition or spacing interval T, as well as by the proper amplitude and polarity control of the correcting pulses, to effect a complete compensation, in the manner described.

According to an improved feature of the invention, a control or pilot signal is transmitted through the transmission channel which serves to control or automatically maintain the cross-talk compensation under widely varying operating conditions.

Thus, in the arrangement shown by Figure 6, a control or pilot signal having a suitable frequency is produced by means of an auxiliary oscillator O and transmitted through the channel $a_s$ in the manner indicated. At the receiver, the pilot tone or signal is separated from the receiving channel $a_k$ by means of a filter F, rectified and applied to an indicating instrument I. A switch S serves to connect the individual receiving channels $a_k$, $b_k$, ... $f_k$ to the filter and indicator. The cross-talk compensating network Q of the type shown in Figure 4 is so adjusted that the control or pilot tone is no longer heard in the channels $b_k$, $c_k$ ... $f_k$, in which case the instrument registers zero when the switch U is connected to the respective channel.

Figure 7:
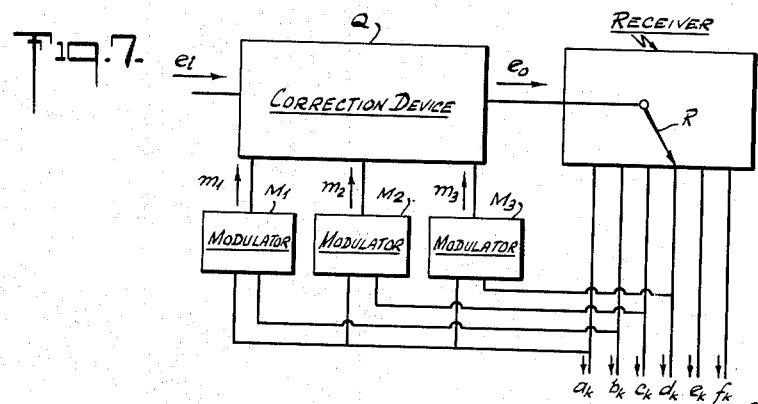
Figure 7 is a diagram illustrating an alternative method of cross-interference control according to the invention.

A modified system for controlling or adjusting the cross-talk compensation is shown in Figure 7. In the latter, the cross-talk signals in the channels $b_k$, $c_k$ ... $f_k$ are compared or mutually intermodulated with the pilot signal in the channel $a_k$ by means of product forming devices, such as modulators $M_1$, $M_2$ and $M_3$, respectively, to produce output or control signals proportional to the product of the input signals and containing direct current components $m_1$, $m_2$ and $m_3$ which vary in accordance with the degree of cross-talk in the respective channels. Components $m_1$, $m_2$ and $m_3$ are utilized to control the amplitude of the correcting signals or pulses produced in the device Q, in such a manner as to effect and maintain an automatic cross-talk compensation.

More specifically, if cross-talk exists between the first and second channel, the control tone, besides appearing in the channel $a_k$ will also appear in reduced intensity in channel $b_k$, whereby to produce an output $m_1$ in the modulator $M_1$ proportional to the product of the input signals and varying in accordance with the degree of the cross-talk both in sign and in magnitude. Assuming the cross-talk factor between channel $a_k$ and $b_k$ to be $g_{12}$, the sinusoidal control tone $h = h_0 \sin w_0 t$ in the channel $a_k$ will produce a tone $g_{12}.h_0 \sin w_0 t$ in the channel $b_k$. The modulation product in $M_1$ is then:

$$m_1 = g_{12}.h_o^2.\sin^2(w_o t) = \frac{1}{2}g_{12}h_o^2 - \frac{1}{2}g_{12}.h_o^2 \cos(2w_o t)$$

the frequency-independent term $$\frac{1}{2}g_{12}h_o^2$$

of which represents the direct current component. This direct current component may be segregated from the modulator output by means of a low-pass filter and is a measure of a cross-talk factor $g_{12}$.

The segregated direct current component is utilized to control the adjustment of the compensator Q. In carrying out the adjustment, the direct current component $m_1$ is caused to disappear, whereby to result in an automatic adjustment of the compensator and suppression of cross-talk between the channels. In the same way, cross-talk between the first and third and fourth channels by means of the modulators $M_2$ and $M_3$ and control signals $m_2$ and $m_3$ may be reduced or automatically suppressed.

The components $m_1$, $m_2$ and $m_3$ may be indicated by means of suitable instruments. If automatic devices are provided, such as shown in detail in the following, the output currents or voltages of the modulators may be utilized to readjust the regulating elements or controls of the compensating device, in such a manner as to reduce and maintain the cross-talk at a minimum. The product forming or modulating devices $M_1$, $M_2$ and $M_3$ may be either electronic modulators, in the form of multi-grid vacuum tubes, rectifiers or mechanical product forming devices of the wattmeter type, as shown in greater detail hereinafter.

Figure 8 shows a system similar to Figure 6, wherein the auxiliary oscillator and control circuit are shown in greater detail. The auxiliary oscillator O for producing the pilot or control frequency is shown in the form of a standard regenerative triode oscillator comprising an oscillating tube 10 which generates an auxiliary or pilot oscillation impressed upon the first channel $a_s$ of the transmitter. This sinusoidal signal is received in the receiver and applied to the corresponding receiving channel $a_k$ by the operation of the receiving distributor, in the manner described and understood from the above.

As a result, a strong pilot signal will occur in the channel $a_k$, while relatively weaker signals of the pilot frequency will be produced in the remaining channels $b_k$, $c_k$ ... of the system, depending upon the degree of cross-talk between the channel $a_k$ and the remaining channels. The compensating device Q is so adjusted as to substantially reduce or suppress the cross-talk interference in the channels $b_k$, $c_k$ ..., in the manner described hereinbefore. The cross-talk control device F comprises in the example shown, a band-pass filter consisting of a series tuned circuit 11 and a pair of parallel tuned shunt circuits 12 and 13, all resonant to the frequency of the pilot oscillations.

The pilot frequency signal is rectified, such as by means of a push-pull rectifier circuit as shown in the drawing comprising a pair of rectifying elements 14 and 15 and a pair of load resistors 16 and 17 by-passed by smoothing condensers 18 and 20, respectively. As a result, the voltage developed across the condensers 18 and 20 will be proportional to the amplitude of the pilot oscillation. This amplitude is measured or indicated by means of the instrument I. The switch serves to connect the control circuit to the various receiving channels $a_k$ ... $f_k$.

In a system of this type, the pilot oscillation occurs with full amplitude or strength in the channel $a_k$ connected to the auxiliary oscillator O. This amplitude may be measured by the instrument I and, if necessary, adjusted to a desired value, by controlling the amplification of the receiver, to render the reception substantially independent of signal level fluctuations and interference. At the same time, the proper signal level will be maintained for the other transmission channels.

If, the control device is connected to one of the remaining receiving channels $b_k$ ... $f_k$ by the switch S, the response or deflection of the instrument will be zero if the cross-talk in the respective channels $b_k$ ... $f_k$ is suppressed by the proper adjustment of the compensating device Q. All that is necessary therefore, in order to adjust the system for optimum cross-talk elimination, is to control the amplitude of the compensating voltages or currents being reapplied to the main transmission path by means of the controls as shown in Figure 4, until the indication of the instrument I disappears.

The frequency of the pilot oscillations may be within the audible range. In this case, transmission of additional speech signals through the channel $a_s$ is not possible. However, the pilot frequency may be so chosen as to be either below or above the audible range, in which case it is advisable to provide resonant trap circuits to suppress the pilot signal in the signal receiving branch of channel $a_k$.

Referring to Figure 9, there is shown a detailed wiring diagram of an arrangement according to Figure 7, for effecting an automatic cross-talk compensation control. The compensating network Q has a delay circuit comprised of a number of parallel capacities 22a, 22b, 22c and 22d and series inductances 23a, 23b and 23c. The delay times of the various sections of the circuit correspond to a spacing interval between successive pulses, in the manner described above. The amplitude of the delayed pulses are controlled, in the example shown, by means of special amplifier control tubes 24a, 24b and 24c which, for this purpose, in addition to the normal input or control grid, are provided with at least one further control grid for effecting the amplitude control of the delayed or correcting pulses.

There is shown a further control tube 25 for adjusting the amplitude of the undelayed pulses. The tubes 24a, 25b, 24c and 25 also serve to provide a mutual decoupling between the various pulses delayed by unequal time intervals. The control of the undelayed signal is effected by means of a potentiometer 26 shunted by a fixed potential source such as a battery 27 and connected between the auxiliary control grid and cathode of the tube 25. The delayed pulses are controlled by special control voltages $m_1$—$m_3$ produced by means of product formers or modulators $M_1$—$M_3$, respectively, in the form of push-pull rectifier circuits in the example illustrated.

The modulators $M_1$, $M_2$ and $M_3$ are excited by a first common input signal derived from the receiving channel $a_k$ through a center tapped transformer 28 serving to change the main pilot signal or oscillation from an unbalanced oscillation to an oscillation balanced with respect to ground or zero reference potential of the system. The amplitude of the derived pilot signal is again indicated or measured by the instrument I, thus enabling a proper control and adjustment of the amplitude level for the entire transmission. The additional input signals for the modulators $M_1$, $M_2$ and $M_3$ are derived from cross-talk pilot oscillations in the receiving channels $b_k$ and $c_k$ by way of condensers 30, 31 and 32, respectively.

If in any of the channels $b_k$, $c_k$ ... the pilot oscillation occurs due to cross-talk interference, a direct current voltage will be produced at the junction points of the rectifiers 33, 34 and 35 of the modulators, said direct current voltage being either positive or negative depending upon the relative phase positions of the oscillations applied to the modulators. The alternating current components of the rectified voltage are eliminated by means of the series resistors 36, 37 and 38 and by-pass condensers 40, 41 and 42, respectively, whereby the auxiliary control grids of the tubes 24a, 24b and 24c are excited by the positive or negative voltages $m_1$, $m_2$ and $m_3$ which are a measure of the degree of cross-talk from the channel $a_k$ upon the channels $b_k$ and $c_k$.

As a result, the amplitudes of the correcting signals derived from the delay circuit are varied automatically, until the pilot signal in the channels $b_k$ and $c_k$ disappears. It should be noted, that the polarity of the correcting pulses derived from the delay circuit should be properly chosen to correspond with the cross-talk factors caused by the transmission distortion. It is possible under the circumstances that a polarity reversal of the connecting pulses applied by way of the tubes 24a, 24b and 24c will be required. This may be achieved by means of a transformer connected with the input or anode circuits of the tubes. Furthermore, the control should be such that an initial cross-talk interference should be reduced by the control voltage, that is the control voltage should be applied to the control tubes with proper polarity. For this purpose, it may be necessary to reverse the polarity of any of the rectifiers 33, 34 and 35.

Referring to Figure 10, there is shown a system similar to Figure 9, wherein the electronic control of the cross-talk compensation is effected by mechanical control devices. According to this embodiment, there is provided a symmetrical delay line comprising series inductances 45a—45b, 46a—46b and 47a—47b and parallel capacities 48a, 48b, 48c and 48d. The amplitude control of the correcting pulses derived from this line is effected by means of control potentiometers 50a, 50b, 50c and 50d shunted across the condensers 48a, 48b, 48c and 48d, respectively. The potentiometers or variable control resistors are operated by means of motors 51a, 51b, 51c and 51d, respectively. For this purpose, the motors, in the example shown, drive threaded shafts or spindles 52a, 52b, 52c and 52d cooperating with travelling nuts 54a, 54b, 54c and 54d, the latter serving to operate the variable sliding contact of the resistors or potentiometers to produce correcting delayed pulses of the proper amplitude, to effect cross-talk compensation.

In order to effect a mutual decoupling between the correcting signals delayed by different time intervals, high ohmic resistors 55a, 55b, 55c and 55d are connected between the potentiometer contacts and the input of the receiver. In order to produce a sufficient decoupling effect, resistors 55a ... 55d should have values substantially higher than the potentiometers 52a ... 52d. The center tapped input transformer 56 serves as a converter between the balanced input signal $e_i$ and unbalanced output signal $e_o$ of the compensating device.

In place of the electronic modulators $M_1$—$M_3$ of Figure 9, wattmeter type systems 58a, 58b, 58c and 58d are provided, each comprising a fixed coil energized by the pilot signal from channel $a_k$ and a movable coil each connected to one of the receiving channels $b_k$—$d_k$, respectively. If the signal components applied to the fixed and movable coils of such a device include components of like frequency, the movable coil system will develop a torque, resulting in a closing of either one of a pair of contacts 60a—60b, 61a—61b, 62a—62b and 63a—63b, respectively, depending upon the sense of rotation of the coils. The contacts 60a—60b ... 63a—63b serve to energize the motors 51a ... 51d by a battery or current source 64, to cause the motors to rotate in either clockwise or anti-clockwise direction, depending upon the rotation of the movable coils of the devices 58a ... 58d. The latter may be in the form of a wattmeter of usual construction, with suitable control arms 65a, 65b, 65c and 65d replacing the usual pointer and cooperating with the respective pairs of stationary controls 60a—60b ... 63a—63b.

According to this embodiment, the electrical control voltages $m_1$ to $m_3$ of Figure 9 are replaced by corresponding mechanical magnitudes in the form of a positive or negative torque of the compensating motors 51a ... 51d. These magnitudes serve to effect the amplitude control of the delayed correcting pulses in such a sense as to reduce the cross-talk until the auxiliary signals practically disappear in the receiving channels $b_k$—$d_k$.

The amplitude of the undelayed receiving signal is controlled by the potentiometer 59a operated by the motor 51a. For this purpose, the pilot signal derived from the channel $a_k$ is rectified by means of a rectifier 65 and applied to the fixed coil of the device 58a by way of a resistance 66. This coil is also connected through a resistance 67 to a voltage source such as a battery 68 providing a constant voltage which corresponds to the desired amplitude or signal level to be maintained. Both voltages act with opposite polarity, whereby, in case of correct receiving amplitude, no voltage will occur across the fixed coil of the device 58a. If the receiving amplitude increases beyond or decreases below the desired level, the voltage across this coil will become either positive or negative, thus producing a torque by the moving coil of the same device 58a either positive or negative, said moving coil being constantly connected to the voltage source 68. This torque serves to operate the contacts 60a or 60b, thus in turn producing a rotation of the motor 51a in the proper direction and resulting in a correction of the signal level to the desired value.

In the arrangement according to Figures 9 and 10, the automatic control may be affected by the speech or other signals being transmitted through the various channels. In this case, it is advisable to interpose suitable filters in the control circuits to suppress the components deviating from the auxiliary frequency.

Referring to Figure 11 there is shown a further arrangement in block diagram form which, in addition to eliminating cross-talk of a given channel upon the succeeding channels, also suppresses cross-talk upon one or more preceding channels of the system. Such a compensation is necessary in multiplex time division transmission by means of amplitude modulated pulses, if the pulses are flattened on both sides as a result of transmission distortion.

By the arrangement shown in Figure 10, cross-talk from one channel upon both the next two preceding and succeeding channels, may be suppressed, in the manner described in the following. The delay line is shown to consist of sections 70a, 70b, 70c and 70d, each designed to produce a time delay equal to a pulse spacing interval. The main signal is derived from the control device 71c connected to the center of the line and accordingly is delayed by two pulse intervals, whereby the correcting signals derived from the control devices 71a, 71b and 71c and 71d lead or lag, respectively, the main signal by one or two pulse intervals, in a manner readily understood. The product formers corresponding to the modulators of Figure 9 or to the electro-mechanical systems of Figure 10, are indicated at 72a, 72b, 72c, 72d and 72e and serve to operate the control devices 71a, 71b, 71c, 71d and 71e either electrically or mechanically as indicated by the dotted lines in the drawing.

Thus, assuming a cross-talk from the channel $a_k$ upon the preceding channel $h_k$, the latter will contain a signal of the auxiliary or pilot oscillation received in the channel $a_k$, whereby the products former 72b will produce a positive or negative control magnitude varying the amplitude of the correcting pulses transmitted through 71b in such a sense as to reduce the cross-talk interference. In this connection, it should be noted that the pulses of the correcting signal lead the corresponding pulses in the main signal path by one pulse interval, whereby the pulses in the channel $a_k$ are applied with corresponding amplitude to the preceding channel $h_k$, which latter is connected to the input of the receiver prior to the channel $a_k$ by an interval equal to a pulse spacing interval as a result of the switching or gating operation by the receiver. In an analogous manner, the channel $g_k$ preceding the main channel by two pulse spacing intervals, as well as the succeeding channels $b_k$ and $c_k$ are compensated or freed from cross-talk interference, in a manner readily understood.

It has already been pointed out that, provided a correct adjustment of the compensating device Q, cross-talk suppression from the second and all succeeding channels upon the neighboring channels will occur in substantially the same manner as described. As in the previous embodiments, it may be advisable to provide a filter 73 to separate the auxiliary oscillation from the useful signals which may have entered the receiving channel $a_k$. Similar filters may be provided in the second input circuit of the devices 72 ... 72e, to suppress any useful signal components received therein. In order to adjust the proper amplitude of the main signal passing through the control device 71c, the device 72c serves to produce a magnitude corresponding to the auxiliary signal amplitude occurring in the channel $a_k$, in a manner similar as described and shown by the preceding figures. This magnitude serves to control the device 71c so as to cause the amplitude of the auxiliary signal to be maintained at a desired value. In this manner, a desired signal level for all the other receiving channels is insured.

Figure 12:
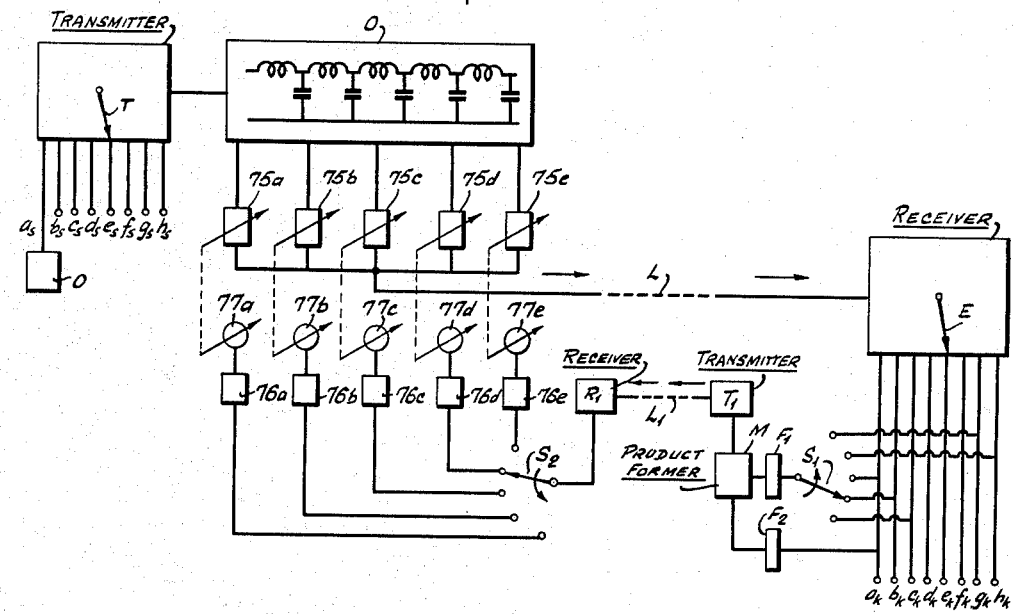
Figure 12 is a further block diagram illustrating a further modification for automatic cross-talk compensation at the transmitter.

Referring to Figure 12, there is shown a compensating device including a delay line D arranged at the transmitter. The amplitudes of the signals derived from said line are adjusted by means of the control elements 75a, 75b, 75c, 75d and 75e in such a manner as to suppress cross-talk from the first channel upon the next two preceding and next two succeeding channels, in a manner described in connection with Figure 11. Since the transmission system as well as the delay line constitute linear networks which are practically free from non-linear amplitude distortion, the succession of the two elements, i. e. the compensating network and transmission line, will be of no importance, thus enabling the shifting of the correcting network to the transmitter as shown in the drawing. The receiver includes a product former M having a first input which is successively connected to the receiving channels $b_k$ ... $h_k$ by means of a periodic switch $S_1$ and through a filter $F_1$, the remaining input of M being permanently connected to the channel $a_k$. The product magnitude formed in M is transmitted by means of an auxiliary transmitter $T_1$ and through an auxiliary transmission line $L_1$ to the main transmitter and applied through an auxiliary receiver $R_1$ to a further periodic switch $S_2$ connected with the control devices 76a, 76b ... 76e, respectively, in the form of relays or the like. The latter in turn serve to operate, through controlling motors 77a, 77b ... 77e the control elements 75a, 75b ... 75e. The switches $S_1$ and $S_2$ are operated synchronously by any known means (not shown), whereby controlling magnitudes will be formed alternately and successively at the receiver corresponding to the degree of cross-talk between the respective neighboring channels. These controlling magnitudes are utilized at the transmitter to operate the control devices of the corresponding cross-talk correcting circuits. Again, a special control device 75c may be provided for the main transmission channel, to maintain a desired amplitude or signal level, in a manner as described in detail hereinbefore.

In a system afore-described, cross-talk responsive control signals are transmitted from the receiver to the transmitter successively and periodically from the different channels and utilized at the transmitter, by means of a synchronous switch, to produce corresponding correcting signals in accordance with any of the systems and methods according to the invention, to maintain automatic cross-talk compensation in the system.

Figure 13:
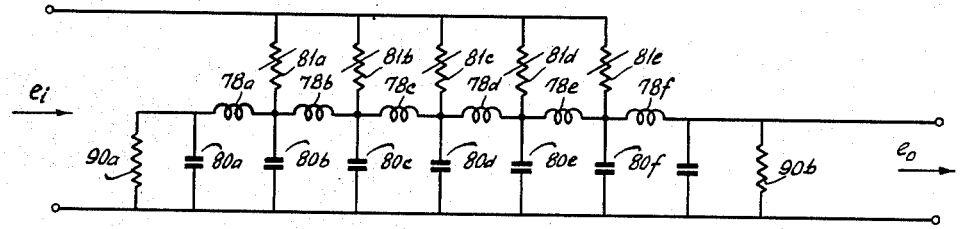
Figure 13 illustrates a modified network for producing delayed correcting signals in accordance with the invention.

In the arrangements heretofore described, the correcting signal pulses are derived from the main pulse signals by transmission through a delay line or network and by deriving the correcting signals from proper points on said line. According to an alternative construction, as shown in Figure 13, the input signals may be simultaneously applied to the various tap points of the line comprising series inductances 79a, 78b ... and parallel capacities 80a, 80b ..., in which case, the corrected signal is derived from the output of the line. In order to control the various cross-talk factors, control devices 81a, 81b ... 81e are again provided. In using a delay line of this type, a proper termination at both ends of the line by a resistance or network 90a and 90b, respectively, is necessary, in order to prevent reflections of the signals travelling in both directions from the connecting points of the line, the same applies when using a center-tapped line for producing both leading and lagging correcting pulses, as shown in Figures 11 and 12.

There is thus provided by the invention a simple and efficient means for continuously ascertaining and/or controlling the cross-talk between any two adjacent channels in a time division pulse multiplex signal transmission system, thus enabling a monitoring and/or automatic compensation of the cross-talk under widely varying operating conditions. The cross-talk responsive signal or magnitude produced for this purpose is obtained in a simple manner by combining or intermodulating a special control signal of predetermined frequency transmitted through one of the channels with the cross-talk components thereof appearing in the adjacent channels to result in a control current or other magnitude proportional to the product of the signals being combined, that is in turn to the degree of cross-talk between the transmission channels.

In the embodiments according to Figures 9 and 10, the auxiliary signal and cross-talk component are shown directly applied to the modulating or other product forming device. It is understood that the signals may be demodulated in a normal manner, such as by passing through a low-pass filter, to convert the pulsed signals into continuous, preferably sinusoidal waves, before application to the modulating or other product forming device. If the received auxiliary signals are directly applied to the product former producing the control magnitude as shown in the drawings, the impedance of the modulator circuit in Figure 9, and the inertia of the movable coil in Figure 10, cause a sufficient filtering or smoothing effect, to produce an intermodulation or product output current or magnitude suitable for controlling the attenuation control devices of the compensating network.

In the foregoing, the invention has been described with specific reference to an illustrative device. It will be evident, however, that variations and modifications, as well as the substitution of equivalent parts and circuits for those shown herein for illustration, may be made in accordance with the broader spirit and scope of the invention as set forth in the appended claims. The specification and drawings are accordingly to be regarded in an illustrative rather than in a limiting sense.

I claim:

1. The combination with a time division pulse multiplex signaling system of the type comprising synchronously operating gating means for transmitting and receiving equi-spaced signal pulses, like-order pulses of successive equal-numbered groups being modulated in accordance with the instantaneous values of different modulating signals, to provide a plurality of equi-spaced time signal channels, and means for suppressing cross-talk between adjacent channels due to distortion of said pulses, said means comprising a main signal path traversed by said signal pulses, at least one auxiliary signal path connected to said main signal path, means for displacing the pulses in said auxiliary path relative to the respective main signal pulses by a time interval equal to the spacing interval between said chalnels, and means including attenuation means connecting said auxiliary signal path with said main path, for re-applying the displaced pulses to said main path with such polarity and amplitude as to cancel cross-talk interference between adjacent channels; of further means for transmitting a pilot signal of predetermined frequency through one of said channels, and means for combining a pair of pilot signals received through said last-mentionel channel and an adjacent channel, respectively, into a single response having a magnitude proportional to the product of said pilot signals and indicative of the degree of cross-talk between adjacent signal channels of said system.

2. The combination with a time division pulse multiplex signaling system of the type comprising synchronously operating gating means for transmitting and receiving equi-spaced signal pulses, like-order pulses of successive equal-numbered groups being modulated in accordance with the instantaneous values of different modulating signals, to provide a plurality of equi-spaced time signal channels, and means for suppressing cross-talk between adjacent channels due to distortion of said pulses, said means comprising a main signal path traversed by said signal pulses, at least one auxiliary signal path connected to said main path, means for displacing the pulses in said auxiliary signal path relative to the respective main signal pulses by a time interval equal to the spacing interval between said channels, and means including attenuation means connecting said auxiliary signal path with said main path for re-applying the displaced pulses to said main path with such polarity and amplitude as to cancel cross-talk interference between adjacent channels; of further means for transmitting a pilot signal of predetermined frequency outside the modulation frequency band of said modulating signals through one of said channels, and means for segregating and combining a pair of pilot signals received through said last-mentioned channel and an adjacent channel, respectively, into a single response having a magnitude proportional to the product of said pilot signals and indicative of the degree of cross-talk between adjacent signal channels of said system.

3. The combination with a time division pulse multiplex signaling system of the type comprising synchronously operating gating means for transmitting and receiving equi-spaced signal pulses, like-order pulses of successive equal-numbered groups being modulated in accordance with the instantaneous values of different modulating signals, to provide a plurality of equi-spaced time signal channels, and means for suppressing cross-talk between adjacent channels due to distortion of said pulses, said means comprising a main signal path traversed by said signal pulses, at least one auxiliary signal path connected to said main path, means for displacing the pulses in said auxiliary signal path relative to the respective main signal pulses by a time interval equal to ths spacing interval between said channels, and means including attenuation means connecting said auxiliary signal path with said main path for re-applying the displaced pulses to said main path with such polarity and amplitude as to substantially cancel cross-talk interference between adjacent channels; of further means for transmitting a pilot signal of predetermined frequency through one of said channels, means for combining a pair of pilot signals received through said last channel and an adjacent channel, respectively, into a single control signal having a magnitude proportional to the product of said pilot signals and indicative of the degree of the cross-talk between adjacent channels, and means for varying said attenuation means responsive to said control signal, to maintain the cross-talk between adjacent channels at a minimum.

4. In a system as claimed in claim 3, wherein said attenuation means is comprised of an electron tube amplifier and said combining means consists of an electric modulator for intermodulating said pilot signals, and means for biasing said amplifier tube by the direct current component of the intermodulation product.

5. In a system as claimed in claim 3, wherein said attenuation means is comprised of a variable resistor and said combining means consists of an electro-dynamic device having fixed and movable coils each excited by one of said pilot signals to produce a torque proportional to the cross-talk between the channels, and means for utilizing said torque to control said resistor both as to sense and magnitude, to maintain a continuous cross-talk suppression.

6. The combination with a time division pulse multiplex signaling system of the type comprising synchronously operating gating means for transmitting and receiving equi-spaced signal pulses, like-order pulses of successive equal-numbered groups being moulated in accordance with the instantaneous values of different modulating signals, to provide a plurality of equi-spaced time signal channels, and means for suppressing crosstalk between adjacent channels due to distortion of said pulses, said means comprising a main signal path traversed by said pulses, a plurality of auxiliary signal paths connected to said main path, means to produce pulses in said auxiliary paths displaced relative to the respective main pulses by whole number, including unity, multiples of the spacing interval between said channels, and means including attenuation means in each of said auxiliary paths for re-applying the displaced pulses to said main path with such polarity and amplitude as to substantially cancel cross-talk interference between one channel and the adjacent channels; of further means for transmitting an auxiliary pilot signal of predetermined frequency through one of said channels, means for separately combining components of said pilot signal received through said last channel each with the cross-talk pilot signal received through one of the remaining channels into a corresponding number of control signals having magnitudes proportional to the products of the respective pair of pilot signals and indicative of the degree of the cross-talk between the respective signal channels, and means for controlling each of said attenuation means by the respective control signals, to maintain the cross-talk between one channel and the adjacent channels of said system at a minimum.

7. In a system as claimed in claim 6, wherein the received auxiliary signal is combined with the cross-talk auxiliary signals successively and periodically, to produce controlling signals for intermittently correcting the cross-talk compensation.

8. The combination with a time division pulse multiplex signaling system of the type comprising synchronously operating gating means for transmitting and receiving equi-spaced signal pulses, like-order pulses of successive equal-numbered groups being modulated in accordance with the instantaneous amplitudes of different modulating signals, to provide a plurality of equi-spaced time signal channels, of means for transmitting an auxiliary signal of predetermined frequency through one of said channels, and further means for combining the auxiliary signals received through said last channel and an adjacent channel into a single response having a magnitude proportional to the product of said pilot signals and indicative of the degree of cross-talk between adjacent signal channels of said system.

9. The combination with a time division pulse multiplex signaling system of the type comprising synchronously operating gating means for transmitting and receiving equi-spaced signal pulses, like-order pulses of successive equal-numbered groups being modulated in accordance with the instantaneous amplitudes of different modulating signals, to provide a plurality of equi-spaced time signal channels, of means for transmitting an auxiliary signal of predetermined frequency through one of said channels, and further means for separately combining the auxiliary signal received through said last channel with each of the auxiliary cross-talk signals received through the adjacent channels into a plurality of response signals having magnitudes proportional to the product of the respective pairs of pilot signals and indicative of the degree of cross-talk between the respective signal channels.

10. The combination with a time division pulse multiplex signaling system of the type comprising synchronously operating gating means for transmitting and receiving equi-spaced signal pulses, like-order pulses of successive equal-numbered groups being modulated in accordance with the instantaneous amplitudes of different modulating signals, to provide a plurality of equi-spaced time signal channels, of means for transmitting an auxiliary signal of predetermined frequency outside the modulation frequency band of said modulating signals through one of said channels, and further means for separately and successively combining the auxiliary signal received through said last channel with each of the auxiliary cross-talk signals received through the adjacent channels into a plurality of signal indications having magnitudes proportional to the product of the respective pairs of pilot signals and indicative of the degree of cross-talk between the respective signal channels.

References Cited in the file of this patent

UNITED STATES PATENTS

| Number | Name | Date |
|---|---|---|
| 2,410,350 | Labin et al. | Oct. 29, 1946 |
| 2,579,071 | Hansell | Dec. 18, 1951 |
| 2,580,421 | Guanella | Jan. 1, 1952 |